Figure 1:
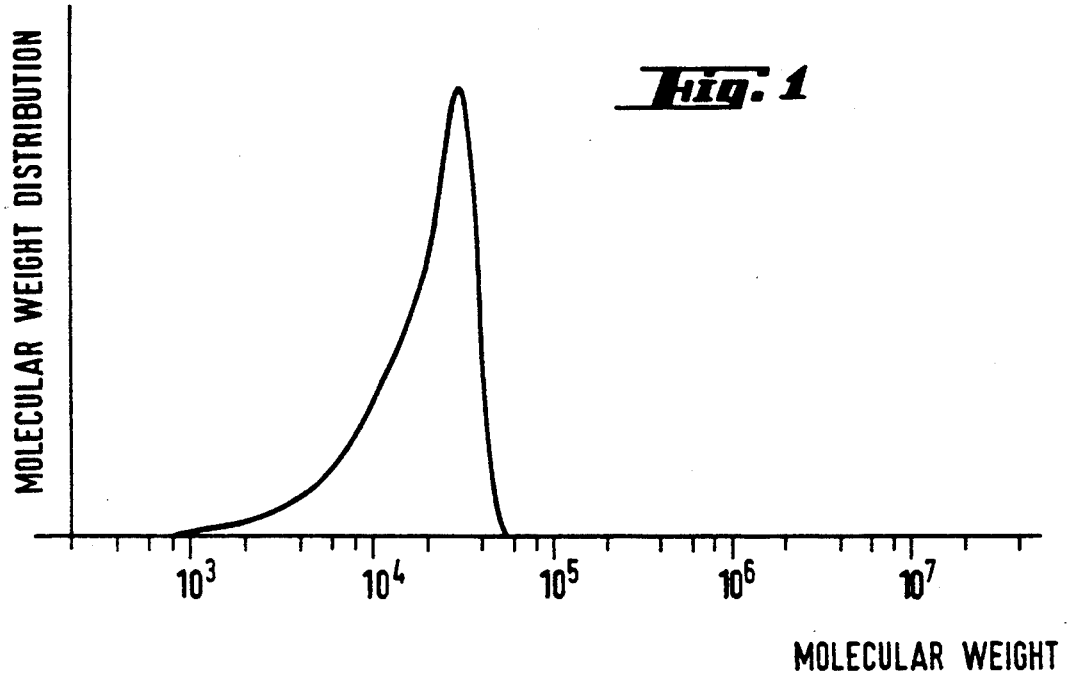
Figure 2:
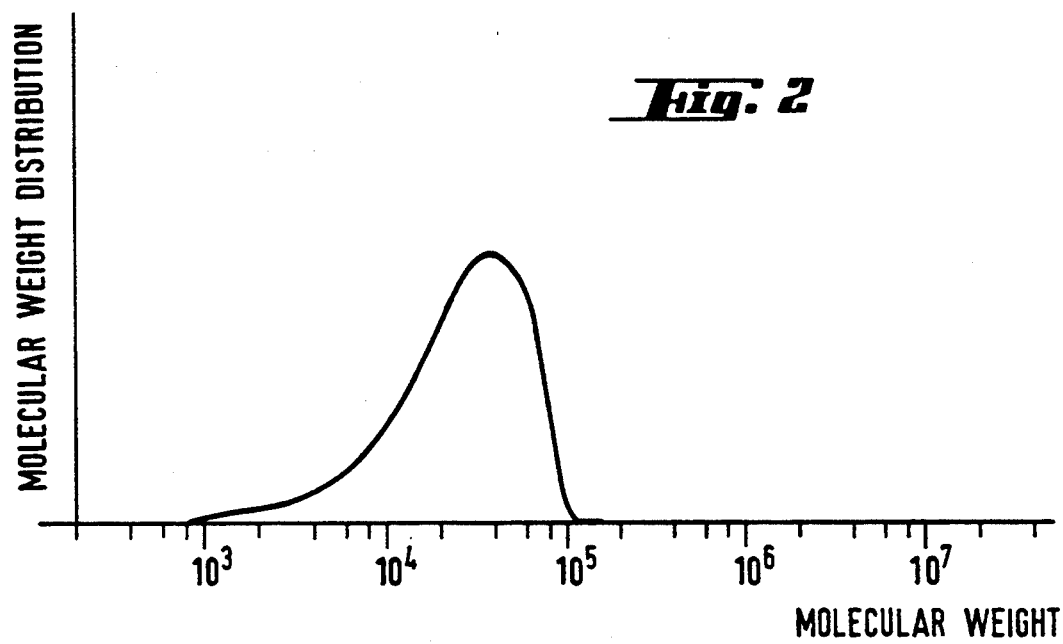
Figure 3:
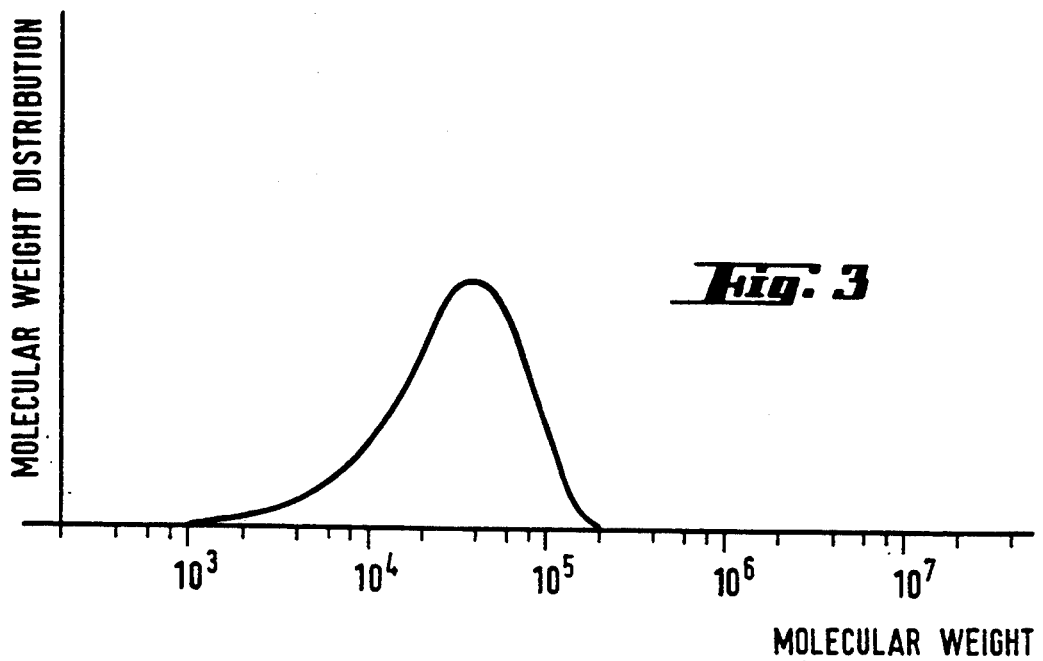
Figure 4:
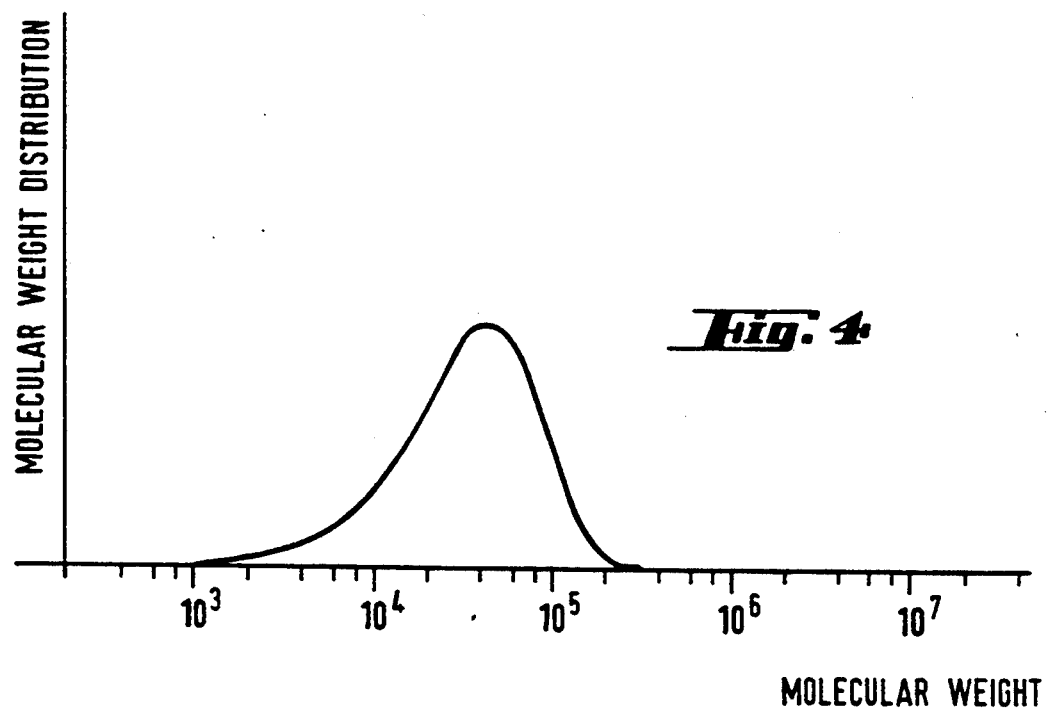

United States Patent [19]

Brekner et al.

[11] Patent Number: 5,422,409
[45] Date of Patent: Jun. 6, 1995

[54] CYCLOOLEFIN (CO)POLYMERS WITH A NARROW MOLECULAR WEIGHT DISTRIBUTION AND A PROCESS FOR THE PREPARATION THEREOF

[75] Inventors: Michael-Joachim Brekner, Frankfurt am Main; Frank Osan, Kelkheim (Taunus), both of Germany

[73] Assignee: Hoechst Aktiengesellschaft, Frankfurt am Main

[21] Appl. No.: 156,929

[22] Filed: Nov. 22, 1993

Related U.S. Application Data

[63] Continuation of Ser. No. 840,500, Feb. 24, 1992, abandoned.

[30] Foreign Application Priority Data

Feb. 27, 1991 [DE] Germany .................... 41 06 107.1

[51] Int. Cl.⁶ .................... C08F 32/08; C08F 32/04; C08L 45/00
[52] U.S. Cl. .................... 526/281; 526/127; 526/133; 526/134; 526/160; 526/165; 526/308; 525/210; 525/216
[58] Field of Search ............ 526/160, 281, 283, 308, 526/127, 133, 134, 150, 165, 308; 525/210, 216

[56] References Cited

U.S. PATENT DOCUMENTS

| 4,178,424 | 12/1979 | Tenney et al. | |
|---|---|---|---|
| 4,918,133 | 4/1990 | Moriya et al. | 525/210 X |
| 5,008,356 | 4/1991 | Ishimaru et al. | 526/281 |
| 5,087,677 | 2/1992 | Brekner et al. | 526/160 |

FOREIGN PATENT DOCUMENTS

| 605897 | 1/1991 | Australia . |
|---|---|---|
| 0156464 | 10/1985 | European Pat. Off. . |
| 0283164 | 9/1988 | European Pat. Off. . |
| 0304671 | 3/1989 | European Pat. Off. . |

OTHER PUBLICATIONS

Patent Abstracts of Japan, vol. 11, No. 60 (C-405)(2507) 24 Feb. 1987 and JP-A-61 221 206 (Mitsui Petrochemical Industries) 1 Oct. 1986.

Primary Examiner—Fred Teskin
Attorney, Agent, or Firm—Connolly & Hutz

[57] ABSTRACT

Polymers of polycyclic olefins such as, for example, norbornene or tetracyclododecene, or copolymers of polycyclic olefins with cycloolefins and/or 1-olefins with a very narrow molecular weight distribution are obtained without ring opening by a polymerization in which a catalyst which is composed of an aluminoxane and of a stereorigid, chiral metallocene compound of an element of groups IVb to VIb is used, and in which the reaction is stopped at a time when the molecular weight distribution Mw/Mn of the polymer formed is <2.

11 Claims, 2 Drawing Sheets

CYCLOOLEFIN (CO)POLYMERS WITH A NARROW MOLECULAR WEIGHT DISTRIBUTION AND A PROCESS FOR THE PREPARATION THEREOF

This application is a continuation of our application Ser. No. 07/840,500, filed Feb. 24, 1992, and now abandoned.

The invention relates primarily to a process for the preparation of homo- and copolymers of polycyclic olefins with a very narrow molecular weight distribution, in which no ring opening takes place.

It is known that polycyclic olefins can be polymerized using various Ziegler catalysts. Depending on the catalyst, the polymerization takes place via ring opening (cf. U.S. Pat. NO. 4,178,424) or opening of the double bond (cf. EP-A 156 464, EP-A 283 164 ).

The disadvantage of a ring-opening polymerization is that the resulting polymer contains double bonds which may lead to crosslinking of chains and thus considerably restrict the processability of the material by extrusion or injection molding.

Polymerization with opening of the double bond has a relatively low polymerization rate (reaction rate) in the case of cyclic olefins.

When polymers are processed by injection molding or when polymer filaments are stretched, it is a great advantage for the molecular weight distribution of the polymers to be as narrow as possible.

It is known that the molecular weight distributions achieved in free-radical polymerizations as well as in classical Ziegler polymerization are broad, i.e. that Mw/Mn is distinctly larger than 2. A molecular weight distribution Mw/Mn=2 can be achieved in the polymerization of olefins carried out using metallocene catalysts. However, even narrower molecular weight distributions would be desirable for specific applications (for example precision injection molding).

The object was therefore to prepare, using a process which is as straightforward as possible, polycycloolefins and cycloolefin copolymers with a distribution which is as narrow as possible.

It has been found, surprisingly, that polycycloolefins and cycloolefin copolymers with molecular weight distributions Mw/Mn<2 can be obtained by using specific metallocene catalysts in combination with particular polymerization conditions such as concentration and temperature, and, in particular, by the choice of particular polymerization times.

This finding is extremely surprising because all the theoretical treatments of Ziegler polymerization hitherto disclosed permit a distribution Mw/Mn=2 as a minimum. Narrower distributions as have been found according to the invention indicate that most of the polymer chains are assembled throughout the polymerization time, i.e. polymerization may, under certain conditions, take place in a very similar manner to a living polymerization as is known, for example, for the anionic polymerization of styrene.

The invention therefore relates to a process for the preparation of a cycloolefin polymer or copolymer with a narrow molecular weight distribution (Mw/Mn) by polymerization of 0.1 to 100% by weight, based on the total amount of the monomers, of at least one monomer of the formulae I, II, III, IV, V or VI

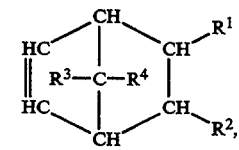

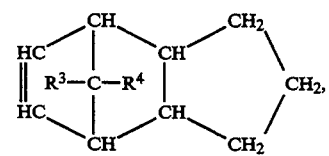

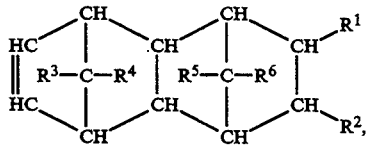

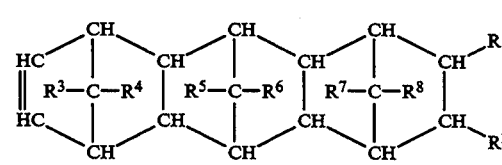

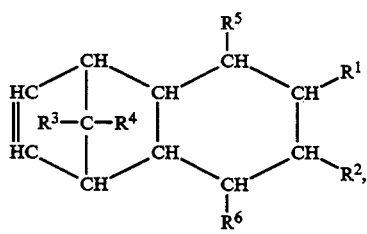

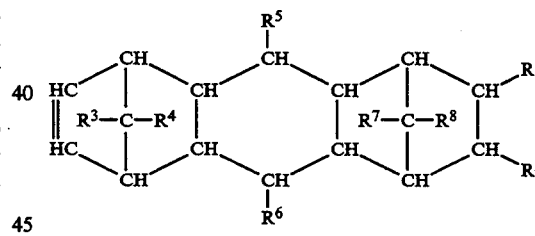

in which $R^1$, $R^2$, $R^3$, $R^4$, $R^5$, $R^6$, $R^7$ and $R^8$ are identical or different and are a hydrogen atom or a $C_1$–$C_8$-alkyl radical, it being possible for identical radicals in the different formulae to have a different meaning, 0 to 99.9% by weight, based on the total amount of the monomers, of a cycloolefin of the formula VII

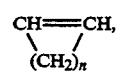

in which n is a number from 2 to 10, and 0 to 99.9 % by weight, based on the total amount of the monomers, of at least one acyclic 1-olefin of the formula VIII

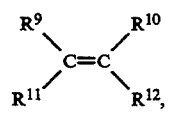

in which $R^9$, $R^{10}$, $R^{11}$ and $R^{12}$ are identical or different and are a hydrogen atom or a $C_1$–$C_8$-alkyl radical, at temperatures from −78° to 150° C. and under a pressure of from 0.01 to 64 bar, in the presence of a catalyst which is composed of an aluminoxane of the formula IX

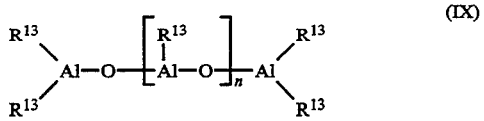 (IX)

for the linear type and/or of the formula X

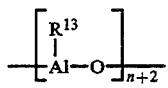 (X)

for the cyclic type, where the radicals $R^{13}$ in the formulae IX and X are identical or different and are a $C_1$–$C_6$-alkyl group or phenyl or benzyl, and n is an integer from 0 to 50, and of a metallocene of the formula XI

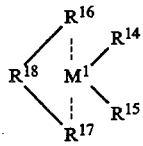 (XI)

in which $M^1$ is titanium, zirconium, hafnium, vanadium, niobium or tantalum, $R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy aryloxy group, a $C_2$–$C_{10}$-alkenyl group, a $C_7$–$C_{40}$-arylalkyl group, a $C_2$–$C_{10}$-alkenyl group, a $C_7$–$C_{40}$-arylalkyl group, a $C_7$–$C_{40}$alkylaryl group or a $C_8$–$C_{40}$-arylalkenyl group, $R^{16}$ and $R^{17}$ are a mono- or polynuclear hydrocarbon radical which with the central atom $M^1$ can form a sandwich structure, $R^{18}$ is

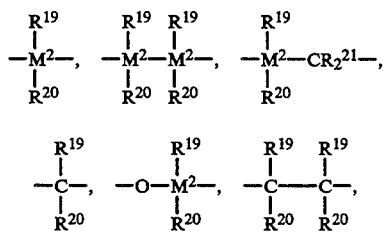

$=BR^{19}$, $=AlR^{19}$, —Ge—, —Sn—, —O—, —S—, $=SO$, $=SO_2$, $=NR^{19}$, $=CO$, $=PR^{19}$ or $=P(O)R^{19}$, where $R^{19}$, $R^{20}$ and $R^{21}$ are identical or different and are a hydrogen atom, a halogen atom, a $C_1$–$C_{10}$-alkyl group, a $C_1$–$C_{10}$-fluoralkyl group, a $C_6$–$C_{10}$-fluoraryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$ or $R^{19}$ and $R^{21}$ each form a ring with the atoms joining them, and $M^2$ is silicon, germanium or tin, which comprises stopping the polymerization at a time when Mw/Mn<2.

In this connection alkyl is straight-chain or branched alkyl.

The monocyclic olefin VII can also be substituted for the purposes of the invention (for example by alkyl or aryl radicals).

The cycloolefin (co)polymers with Mw/Mn<2 which are prepared according to the invention are novel and the present invention likewise relates to them.

In the process according to the invention, at least one polycyclic olefin of the formulae I, II, III, IV, V or VI, preferably a cycloolefin of the formulae I or III, in which $R^1$, $R^2$, $R^3$, $R^4$, $R^5$, $R^6$, $R^7$ and $R^8$ are identical or different and are a hydrogen atom or a $C_1$–$C_8$-alkyl radical, it being possible for identical radicals in the different formulae to have a different meaning, is polymerized. Where appropriate, a monocyclic olefin of the formula VII in which n is a number from 2 to 10 is also used. Another comonomer is an acyclic 1-olefin of the formula VIII in which $R^9$, $R^{10}$, $R^{11}$ and $R^{12}$ are identical or different and are a hydrogen atom or a $C_1$–$C_8$-alkyl radical. Ethylene or propylene are preferred. Copolymers of polycyclic olefins, preferably of the formulae I and III, with the acyclic olefins VIII are particularly prepared.

Particularly preferred cycloolefins are norbornene and tetracyclododecene, it being possible for these to be substituted by ($C_1$–$C_6$)-alkyl. They are preferably copolymerized with ethylene; ethylene/norbornene copolymers have particular importance.

The polycyclic olefin (I to VI) is employed in an amount of 0.1 to 100% by weight and the monocyclic olefin (VII) is employed in an amount of 0 to 99.9% by weight, in each case based on the total amount of the monomers.

The concentration of the open-chain olefin is determined by the solubility of the open-chain olefin in the reaction medium under the given pressure and at the given temperature.

By polycyclic olefins, monocyclic olefins and open-chain olefins are also meant mixtures of two or more olefins of the particular type. This means that besides polycyclic homopolymers and bicopolymers it is also possible to prepare ter- and multicopolymers by the process according to the invention. Copolymers of the cycloolefins VII with the acyclic olefins VIII can also be obtained advantageously by the process described. The preferred cycloolefin VII is cyclopentene, which can be substituted.

The catalyst to be used for the process according to the invention is composed of an aluminoxane and of at least one metallocene (transition metal component) of the formula XI

 (XI)

$M^1$ in the formula XI is a metal from the group comprising titanium, zirconium, hafnium, vanadium, niobium and tantalum, preferably zirconium and hafnium. Zirconium is particularly preferably used.

$R^{14}$ and $R^{15}$ are identical or different and are a hydrogen atom, a $C_1$–$C_{10}$-, preferably $C_1$–$C_3$-alkyl group, a $C_1$–$C_{10}$-, preferably $C_1$–$C_3$-alkoxy group, a $C_6$–$C_{10}$-, preferably $C_6$–$C_8$-aryl group, a $C_6$–$C_{10}$-, preferably $C_6$–$C_8$-aryloxy group, a $C_2$–$C_{10}$-, preferably $C_2$–$C_4$-alkenyl group, a $C_7$–$C_{40}$-, preferably $C_7$–$C_{10}$-arylalkyl group, a $C_7$–$C_{40}$-, preferably $C_7$–$C_{12}$-alkylaryl group, a $C_8$–$C_{40}$-, preferably $C_8$–$C_{12}$-arylalkenyl group or a halogen atom, preferably chlorine.

$R^{16}$ and $R^{17}$ are identical or different and are a mono- or polynuclear hydrocarbon radical which with the central atom $M^1$ can form a sandwich structure. $R^{16}$ is preferably fluorenyl and $R^{17}$ is preferably cyclopentadienyl.

$R^{18}$ is a linker which has one or more members and which links the radicals $R^{16}$ and $R^{17}$ and is preferably

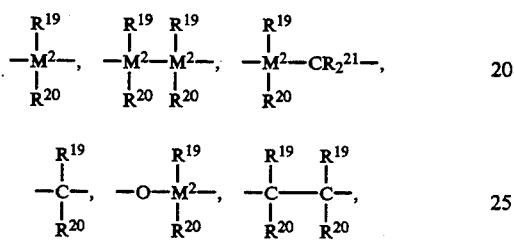

=$BR^{19}$, =$AlR^{19}$, —Ge—, —Sn—, —O—, —S—, =SO, =SO$_2$, =$NR^{19}$, =CO, =$PR^{19}$ or =P(O)$R^{19}$, where $R^{19}$, $R^{20}$ and $R^{21}$ are identical or different and are a hydrogen atom, a halogen atom, a $C_1$–$C_{10}$-alkyl group, a $C_1$–$C_{10}$-fluoralkyl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$ or $R^{19}$ and $R^{21}$ each form, together with the atoms connecting them, a ring.

$M^2$ is silicon, germanium or tin, preferably silicon or germanium.

The bridged metallocenes can be prepared as shown in the following known reaction scheme:

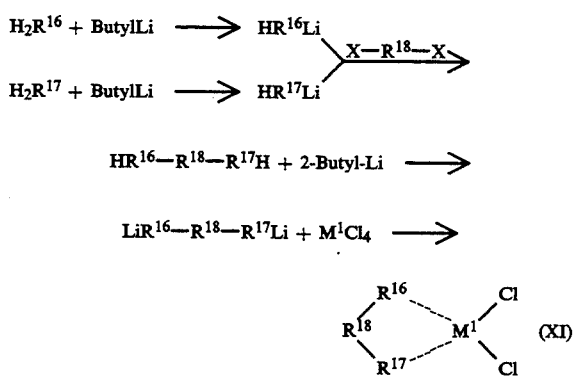

or

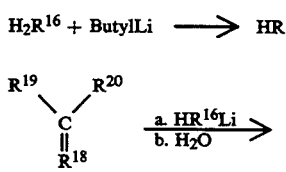

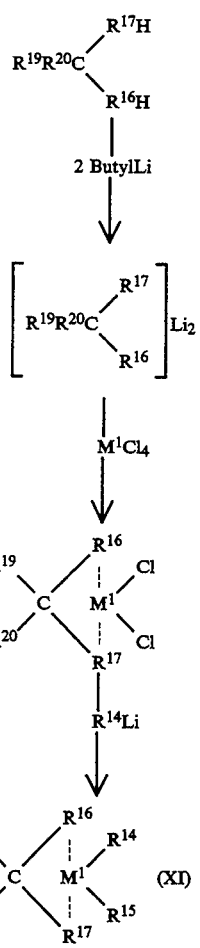

The above reaction scheme also applies when $R^{19}=R^{20}$ and/or $R^{14}=R^{15}$ (cf. Journal of Organometallic Chem. 288 (1985) 63–67 and EP-A 320 762).

Metallocenes which are preferably employed are: rac-dimethylsilyl-bis(1-indenyl)zirconium dichloride, rac-dimethylgermyl-bis(1-indenyl)zirconium dichloride, rac-phenylmethylsilyl-bis(1-indenyl)zirconium dichloride, rac-phenylvinylsilyl-bis(1-indenyl)zirconium dichloride, 1-silacyclobutyl-bis(1-indenyl)zirconium dichloride, rac-diphenylsilyl-bis(1-indenyl)hafnium dichloride, rac-phenylmethylsilyl-bis(1-indenyl)hafnium dichloride, rac-diphenylsilyl-bis(1-indenyl)zirconium dichloride, diphenylmethylene(9-fluorenyl)cyclopentadienylzirconium dichloride, isopropylene(9-fluorenyl)cyclopentadienylzirconium dichloride.

Particularly preferred in this connection are: rac-dimethylsilyl-bis(1-indenyl)zirconium dichloride, rac-phenylmethylsilyl-bis(1-indenyl)zirconium dichloride, rac-phenylvinylsilyl-bis(1-indenyl)zirconium dichloride, rac-diphenylsilyl-bis(1-indenyl)zirconium dichloride, diphenylmethylene(9-fluorenyl)cyclopentadienylzirconium dichloride, isopropylene(9-fluorenyl)cyclopentadienylzirconium dichloride or phenylmethylmethylene(9-fluorenyl)cyclopentadienylzirconium dichloride.

The cocatalyst is an aluminoxane of the formula IX for the linear type and/or of the formula X for the cyclic type. The radicals $R^{13}$ in these formulae can be identical or different and are a $C_1$–$C_6$-alkyl group, preferably methyl, ethyl or isobutyl, butyl or neopentyl, or phenyl or benzyl. Methyl is particularly preferred. n is an integer from 0 to 50, preferably 5 to 40.

The aluminoxane can be prepared in a variety of ways by known processes. One of the methods is, for example, to react an aluminum-hydrocarbon compound and/or a hydridoaluminum-hydrocarbon compound with water (gaseous, solid, liquid or bound—for example as water of crystallization) in an inert solvent (such as, for example, toluene). To prepare an aluminoxane with different alkyl groups $R^{13}$, two different aluminum trialkyls $(AlR_3 + AlR'_3)$ appropriate for the required composition are reacted with water (cf. S. Pasynkiewicz, Polyhedron 9 (1990) 429 and EP-A 302 424).

The exact structure of the aluminoxanes is unknown.

Irrespective of the mode of preparation, it is common to all aluminoxane solutions that the content of unreacted aluminum starting compound, which is present in free form or as adduct, varies.

It is possible for the metallocene to be preactivated with an aluminoxane of the formula (IX) and/or (X) before use in the polymerization reaction. This distinctly increases the polymerization activity.

The preactivation of the transition metal compound is carried out in solution. This preferably entails the metallocene being dissolved in a solution of the aluminoxane in an inert hydrocarbon. A suitable inert hydrocarbon is an aliphatic or aromatic hydrocarbon. Toluene or cyclohexane are preferably used.

The concentration of the aluminoxane in the solution is in the range from about 1% by weight to the saturation limit, preferably from 5 to 30% by weight, in each case based on the total solution. The metallocene can be employed in the same concentration, but it is preferably employed in an amount of $10^{-4}-1$ mol per mol of aluminoxane. The preactivation time is 5 minutes to 60 hours, preferably 5 to 60 minutes. The temperature is from $-78°$ C. to $100°$ C., preferably $0°$ to $70°$ C.

The metallocene can also be prepolymerized or applied to a support. It is preferable to use the (or one of the) olefin(s) employed in the polymerization for the prepolymerization.

Examples of suitable supports are silica gels, aluminas, solid aluminoxane or other inorganic support materials. A suitable support material is also a polyolefin powder in finely divided form.

Another possible embodiment of the process according to the invention comprises using in place of or in addition to an aluminoxane a salt-like compound of the formula $R_xNH_{4-x}BR'_4$ or of the formula $R_3PHBR'_4$ as cocatalyst. In this, x is 1, 2 or 3, R is alkyl or aryl, identical or different, and R' is aryl which can also be fluorinated or partially fluorinated. In this case, the catalyst is composed of the product of the reaction of a metallocene with one of the said compounds (cf. EP-A 277 004).

Any solvent added in a relatively small amount to the reaction mixture is one of the conventional inert solvents such as, for example, aliphatic or cycloaliphatic hydrocarbons (for example cyclohexane), petroleum spirit or hydrogenated diesel oil fractions or toluene.

The polymerization takes place in dilute solution (<80% by volume cycloolefin), in concentrated solution (>80% by volume cycloolefin) or directly in the undiluted liquid cycloolefin monomer.

The temperature and the reaction time must be appropriately suited to one another depending on the activity of the catalyst, the required molecular weight and the required molecular weight distribution. The concentration of the monomers and the nature of the solvent must also be taken into account in this, especially since these parameters essentially determine the relative incorporation rates of the monomers and thus are crucial for the glass transition temperature and heat distortion temperature of the polymers.

The lower the temperature chosen within the range from $-78°$ to $150°$ C., preferably between $-78°$ and $70°$ C., and particularly preferably between $-78°$ and $40°$ C., the longer it is possible for the polymerization time to be for the same breadth of molecular weight distribution Mw/Mn (cf. Tab. 2). Preferred molecular weight distributions are $Mw/Mn \leq 1.7$, in particular $Mw/Mn \leq 1.4$.

If it is also wished to aim at a particular molecular weight, it is necessary for the reaction time also to be adjusted to suit the required molecular weight.

The reaction time required until the reaction is stopped, which varies depending on the said reaction parameters and the cycloolefin incorporation rate, is determined by straightforward sampling as described in the exemplary embodiments. It is possible from series of experiments to construct diagrams from which the required times can then be taken (predetermined) (cf. FIG. 1).

In order to achieve narrow molecular weight distributions there must be substantial omission of transfer reagents such as, for example, hydrogen. It is possible to control the molecular weight via the reaction time.

If pure open-chain olefin, for example ethylene, is injected, pressures between 0.01 and 64 bar are employed, preferably 2 to 40 bar and particularly preferably 4 to 20 bar. If an inert gas, for example nitrogen or argon, is also injected in addition to the open-chain olefin, the total pressure in the reaction vessel is 4 to 64 bar, preferably 4 to 40 bar and particularly preferably 4 to 25 bar. If the cycloolefinic component is undiluted, a high rate of cycloolefin incorporation is achieved also under high pressures.

Continuous and multistage polymerization processes are particularly advantageous because they make economic use of the cycloolefin possible. It is also possible in continuous processes for the polycyclic olefin which can result as residual monomer together with the polymer to be recovered and returned to the reaction mixture.

The metallocene compound is used in a concentration, based on the transition metal, of $10^{-3}$ to $10^{-8}$, preferably $10^{-4}$ to $10^{-6}$, mol of transition metal per $dm^3$ of reactor volume. The aluminoxane is used in a concentration of $10^{-4}$ to $10^{-1}$, preferably $10^{-4}$ to $2 \times 10^{-2}$, mol per $dm^3$ of reactor volume, based on the aluminum content. However, higher concentrations are also possible in principle.

Apart from the said bridged metallocenes, it is also possible in principle to employ metallocenes with identical or similar unbridged ligands. The selected reaction times with these metallocenes must be distinctly shorter than with the bridged metallocenes under comparable reaction conditions.

In the preparation of copolymers, the molar ratios of the polycyclic olefin to the open-chain olefin which is (preferably) employed can vary within a wide range. The molar ratios of cycloolefin to open-chain olefin which are preferably employed are from 3:1 to 100:1. The incorporation rate of comonomer can be controlled virtually as required by the choice of the polymerization temperature, by the concentration of the catalyst components and by the molar ratio employed and the pressure of the gaseous open-chain olefin. Incorporation rates between 20 and 75 mol % of the cyclic components are preferred, and incorporation rates between 35 and 65 mol % of the cyclic components are particularly preferred.

It is possible with the described process to prepare amorphous copolymers. The copolymers are transparent. They are soluble, for example, in decahydronaphthalene at 135° C. and in toluene at room temperature. The polymers according to the invention are thermoplasts. Negligible breakdown or viscosity buildup has been found both on extrusion and on injection molding.

The materials prepared according to the invention are suitable for the production of shaped articles, particularly for the production of extruded articles such as sheets, tubes, pipes, rods and filaments and for the production of injection-molded articles of any required shape and size. An important property of the materials according to the invention is, besides the satisfactory flowability of the melt, their transparency. This means that the optical applications of the extruded or injection-molded articles made from these materials have particularly great importance. The refractive index, determined with an Abbe refractometer and mixed light, of the reaction products described in the following examples is in the range between 1.520 and 1.555. Since the refractive index is very close to that of crown glass (n=1.51), the products according to the invention can be used as glass substitute in various applications such as, for example, lenses, prisms, backing plates and sheets for optical data stores, for videodisks, for compact disks, as covering and focusing plates for solar cells, as covering and diffusing plates for power optics, as light waveguides in the form of fibers or sheets.

The polymers according to the invention can also be employed for producing polymer blends. The blends can be produced in the melt or in solution. The blends have a combination of the properties of the components which is beneficial in each case for particular applications. The following polymers can be employed for blends with the polymers according to the invention:

polyethylene, polypropylene, (ethylene/propylene) copolymers, polybutylene, poly(4-methyl-l-pentene), polyisoprene, polyisobutylene, natural rubber, poly(methylmethacrylate), other polymethacrylates, polyacrylates, (acrylate/methacrylate) copolymers, polystyrene, (styrene/acrylonitrile) copolymers, bisphenol A polycarbonate, other polycarbonates, aromatic polyester carbonates, polyethylene terephthalate, polybutylene terephthalate, amorphous polyarylates, nylon 6, nylon 66, other polyamides, polyaramides, polyether ketones, polyoxymethylene, polyoxyethylene, polyurethanes, polysulfones, polyether sulfones, polyvinylidene fluoride and cycloolefin (co)polymers with a molecular weight distribution Mw/Mn≧2.

It is also possible to blend a plurality of polymers according to the invention together to achieve particular melting properties.

The glass transition temperatures (Tg) stated in the following examples were determined by DSC (differential scanning calorimetry) at a heating rate of 20° C./min. The stated viscosity numbers were measured by the DIN 53 728 method. The molecular weight distribution (Mw/Mn) and the molecular weight (Mw) of the reaction products were determined by gel permeation chromatography.

Example 1

A clean and dry 1.5 dm$^3$ polymerization reactor with stirrer was flushed with nitrogen and then with ethylene and charged with 576 ml of an 85 percent by volume solution of norbornene in toluene.

While stirring, the reactor was then maintained at a temperature of 70° C., and 6 bar of ethylene (gage pressure) were injected.

Then 20 cm$^3$ of a solution of methylaluminoxane in toluene (MAO solution) (10.1% by weight methylaluminoxane with molecular weight 1,300 g/mol determined by cryoscopy) were metered into the reactor, and the mixture was stirred at 70° C. for 15 min, during which the ethylene pressure was maintained at 6 bar by subsequent metering. In parallel with this, 60 mg of rac-dimethylsilyl-bis(1-indenyl)zirconium dichloride were dissolved in 10 cm$^3$ of a solution of methylaluminoxane in toluene (see above for concentration and characteristics) and preactivated by being left to stand for 15 minutes. The solution of the complex was then metered into the reactor. While stirring (750 rpm), polymerization was then carried out at 70° C., maintaining the ethylene pressure at 6 bar by subsequent metering.

50 ml samples were taken from the reaction medium through an air lock at intervals of 15 min after addition of the catalyst.

The samples were rapidly discharged into a stirred vessel containing 100 cm$^3$ of isopropanol (stopper; stoppage of the reaction). The mixture was added dropwise to 2 dm$^3$ of acetone, stirred for 10 min and then the suspended polymeric solid was filtered off.

The filtered-off polymer was then added to 2 dm$^3$ of a mixture of 2 parts of 3-normal hydrochloric acid and one part of ethanol, and this suspension was stirred for 2 hours. The polymer was then filtered off again, washed with water to neutrality and dried at 80° C. under 0.2 bar for 15 hours.

The properties of the samples are shown in Table 1 and FIGS. 1 to 4. These distinctly show, in FIGS. 1 (sample A)–4(sample D), the change in the molecular weight Mw (increase) and in the molecular weight distribution (broadening) as the reaction time increases.

TABLE 1

| Sample | Time after cat. addition (min) | Glass transition temperature (°C.) | Mw (g/mol) | Mw/Mn |
|---|---|---|---|---|
| A | 15 | 162 | $2.06 \times 10^4$ | 1.7 |
| B | 30 | 161 | $3.25 \times 10^4$ | 2.2 |
| C | 45 | 159 | $3.95 \times 10^4$ | 2.2 |
| D | 60 | 158 | $4.57 \times 10^4$ | 2.5 |

Example 2

The process was carried out in analogy to Example 1, but the following parameters were changed:
Reaction temperature: 20° C.
Amount of catalyst: 240 mg
Sampling: every 10 minutes
The properties of the samples are shown in Table 2.

TABLE 2

| Sample | Time after cat. addition (min) | Glass transition temperature (°C.) | Mw (g/mol) | Mw/Mn |
|---|---|---|---|---|
| E | 10 | 140 | $1.67 \times 10^4$ | 1.1 |
| F | 20 | 143 | $2.83 \times 10^4$ | 1.1 |
| G | 30 | 143 | $3.99 \times 10^4$ | 1.1 |
| H | 40 | 144 | $4.88 \times 10^4$ | 1.1 |

Example 3

54 g of a polymer were prepared in analogy to Example 1 but differing from Example 1 in the selection of the following polymerization conditions:

concentration of the norbornene solution employed: 27%;

ethylene pressure: 3 bar;

catalyst: fluorenyl-cyclopentadienyl-diphenylcarbyl-zirconium dichloride;

amount of catalyst: 10 mg;

amount of methylaluminoxane solution: 20 ml;

reaction times 30 min.

The resulting polymer has a glass transition temperature of 141° C., a Mw of $1.63 \times 10^5$ and a molecular weight distribution Mw/Mn of 2.0.

Example 4

The polymerization was carried out in analogy to Example 1. 40 cm³ of MAO solution with 500 mg of rac-dimethylsilyl-bis(1-indenyl)zirconium dichloride were employed as catalyst solution. Polymerization was carried out at 6° C. under an ethylene gauge pressure of 4 bar for 30 min. It was possible to obtain 3.8 g of product. The glass transition temperature was 122° C. A molecular weight Mw of 2,540 g/mol and a molecular weight distribution Mw/Mn of 1.15 were found by GPC (in analogy to Example 1+2).

Example 5

The polymerization was carried out in analogy to Example 4. Polymerization was carried out at 20° C. and under an ethylene gauge pressure of 6 bar for 10 min. 10.4 g of product were isolated. The glass transition temperature was 142° C. The molecular weight Mw was 7,240 g/mol and the molecular weight distribution Mw/Mn was 1.10.

Example 6

2.4 g of a polymer according to Example 3 and 0.6 g of a polymer according to Example 4 were dissolved in 147 g of toluene and then precipitated by slow dropwise addition to acetone. The precipitated material was then dried in a drying oven at 80° C. for one day. The polymer blend obtained in this way had a glass transition temperature of 138° C. measured by DSC with a heating rate of 20° C./minute.

Example 7

48 g of a polymer according to Example 3 and 12 g of a polymer according to Example 5 were mixed and kneaded in a Rheomix 600 measuring kneader supplied by Haake at a speed of 60 revolutions per minute at 225° C. for 15 minutes. The blend obtained in this way was transparent and had a glass transition temperature of 141° C. measured by DSC with a heating rate of 20° C./minute.

Example 8

Circular compressed disks with a diameter of 25 mm were produced from the materials according to Examples 3, 6 and 7 by compression at 225° C. for 15 minutes. All the compressed disks were colorless and transparent. To evaluate and compare the processability of these materials, the compressed disks obtained in this way were used to determine the viscosity ETA. The apparatus used for this was a Rheometrics dynamic spectrometer RDS 2. The measurements were carried out with disk-disk geometry at 270° C. and at two frequencies. The results of the measurements are compiled in Table 3.

TABLE 3

| Sample identification according to Example No. | Viscosity ETA (Pa.s) | |
|---|---|---|
| | Frequency 1 1 rad/s | Frequency 2 10 rad/s |
| 3 | $6.41 \times 10^3$ | $2.63 \times 10^3$ |
| 6 | $2.47 \times 10^3$ | $1.09 \times 10^3$ |
| 7 | $2.67 \times 10^3$ | $1.15 \times 10^3$ |

We claim:

1. A process for the preparation of a cycloolefin polymer or copolymer with a narrow molecular weight distribution (Mw/Mn) by polymerization of 0.1 to 100% by weight, based on the total amount of the monomers, of at least one monomer of the formulae I, II, III, IV, V or VI

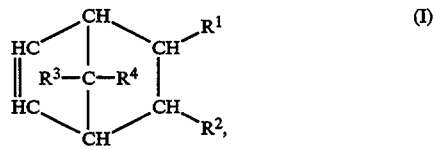

(I)

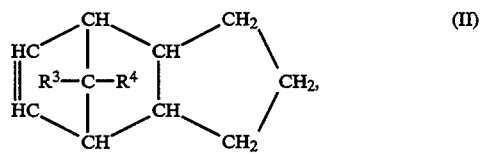

(II)

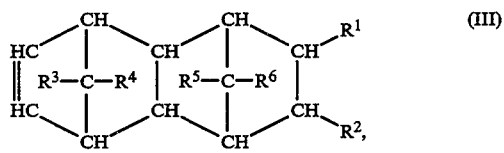

(III)

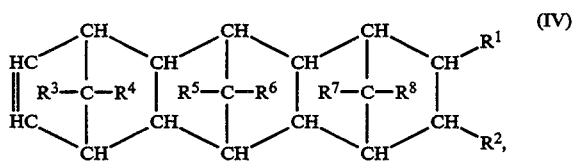

(IV)

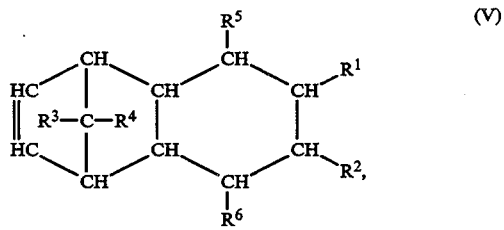

(V)

-continued

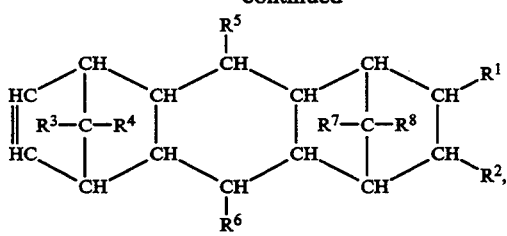

in which $R^1$, $R^2$, $R^3$, $R^4$, $R^5$, $R^6$, $R^7$ and $R^8$ are identical or different and are a hydrogen atom or a $C_1$-$C_8$-alkyl radical, identical radicals in the different formulae having the same or a different meaning, 0 to 99.9% by weight, based on the total amount of the monomers, of a cycloolefin of the formulae VII

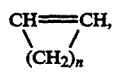

in which n is a number from 2 to 10, and 0 to 99.9% by weight, based on the total amount of the monomers, of at least one acyclic 1-olefin of the formula VIII

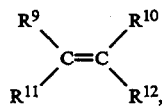

in which $R^9$, $R^{10}$, $R^{11}$ and $R^{12}$ are identical or different and are a hydrogen atom or a $C_1$-$C_8$-alkyl radical, at temperatures from $-78°$ to $150°$ C. and under a pressure of from 0.01 to 64 bar, in the presence of a catalyst which is comprised of an aluminoxane of the formula IX

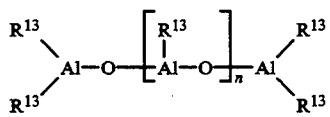

for the linear type and/or of the formula X

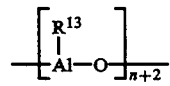

for the cyclic type, where the radicals $R^{13}$ in the formulae IX and X are identical or different and are a $C_1$-$C_6$-alkyl group or phenyl or benzyl, and n is an integer from 0 to 50, and of a metallocene of the formula XI

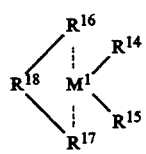

in which $M^1$ is titanium, zirconium, hafnium, vanadium, niobium or tantalum, $R^{14}$ and $R^{15}$ are identical or different and are a hydrogen atom, a halogen atom, a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$alkenyl group, a $C_7$-$C_{40}$-arylalkyl group, a $C_7$-$C_{40}$-alkylaryl group or a $C_8$-$C_{40}$-arylalkenyl group, $R^{16}$ and $R^{17}$ are mono- or polynuclear hydrocarbon radicals which form a sandwich structure with the central atom $M^1$, $R^{18}$ is

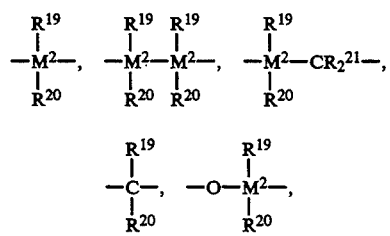

$=BR^{19}$, $=AlR^{19}$, $-Ge-$, $-Sn-$, $-O-$, $-S-$, $=SO$, $=SO_2$, $=NR^{19}$, $=CO$, $=PR^{19}$ or $=P(O)R^{19}$, where $R^{19}$, $R^{20}$ and $R^{21}$ are identical or different and are each one of the following substituents: a halogen atom, a $C_1$-$C_{10}$-alkyl group, a $C_1$-$C_{10}$-fluoroalkyl group, a $C_6$-$C_{10}$-fluoraryl group, a $C_6$-$C_{10}$-aryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, or any one of $R^{19}$, $R^{20}$ and $R^{21}$ is hydrogen, unless $R^{18}$ is

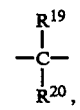

in which case at least one of $R^{19}$ and $R^{20}$ is not hydrogen but is a said substituent, or $R^{19}$ $R^{20}$ or $R^{19}$ and $R^{21}$ each form a ring with the atoms joining them, and $M^2$ is silicon, germanium or tin, which comprises stopping the polymerization at a time when $Mw/Mn < 2$.

2. The process as claimed in claim 1, wherein the polymerization is stopped at a time when Mw/Mn is $\leq 1.7$.

3. The process as claimed in claim 1, wherein the polymerization is stopped at a time when Mw/Mn is $\leq 1.4$.

4. A cycloolefin polymer or copolymer which is prepared by the process as claimed in claim 1.

5. A shaped article which is produced from a cycloolefin polymer or copolymer as claimed in claim 4.

6. A polymer blend containing a cycloolefin polymer or copolymer as claimed in claim 4.

7. The process as claimed in claim 1, wherein no ring opening of the monomer or monomers takes place during the polymerization, wherein the polymerization is stopped at a time when Mw/Mn is $<1.7$, and wherein the polymerization time is determined by repeated sampling of the polymerization medium.

8. The process as claimed in claim 1, wherein, in said metallocene of formulae XI, $R^{18}$ is

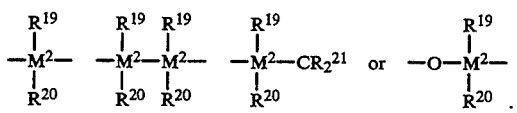

9. The process as claimed in claim 1, wherein said metallocene is diphenylmethylene(9-fluorenyl)cyclopentadienylzirconium dichloride, phenylmethylmethylene(9-fluorenyl)cyclopentadienylzirconium dichloride, or isopropylene(9-fluorenyl)cyclopentadienylzirconium dichloride.

10. The process as claimed in claim 9, wherein said metallocene is diphenylmethylene(9-fluorenyl)cyclopentadienylzirconium dichloride.

11. The process as claimed in claim 1, wherein the relationship between $M_w/M_n$ and the polymerization time is determined by repeated sampling of the polymerization medium.

* * * * *